United States Patent [19]

Blessing

[11] Patent Number: 4,863,324

[45] Date of Patent: Sep. 5, 1989

[54] QUICK CHANGE ATTACHMENT FOR CLAMPING CHUCKS

[76] Inventor: Hermann Blessing, Hölderlinstrasse, D-7302 Ostfildern, Fed. Rep. of Germany

[21] Appl. No.: 232,758

[22] Filed: Aug. 16, 1988

[30] Foreign Application Priority Data

Jul. 11, 1988 [EP] European Pat. Off. ........ 88111050.6

[51] Int. Cl.$^4$ .............................................. B23C 1/00
[52] U.S. Cl. .................. 409/233; 408/239 R
[58] Field of Search ............ 409/233, 234, 231; 29/568, 26.8; 408/239 R, 238 A, 238; 279/1 TS

[56] References Cited

U.S. PATENT DOCUMENTS

| | | | |
|---|---|---|---|
| 4,226,562 | 10/1980 | Schmid et al. | 409/233 |
| 4,352,612 | 10/1982 | Benatti | 409/233 |
| 4,411,568 | 10/1983 | Rohm | 409/233 |
| 4,589,808 | 5/1986 | O'Connor | 409/233 |
| 4,604,009 | 8/1986 | Tennerstedt | 409/233 |
| 4,604,012 | 8/1986 | Kanasaki et al. | 409/233 |
| 4,605,349 | 8/1986 | Bone | 409/233 X |
| 4,617,846 | 10/1986 | Horsch | 409/233 X |
| 4,762,447 | 8/1988 | Marantette | 409/234 |
| 4,764,064 | 8/1988 | Grienke | 409/233 |
| 4,777,714 | 10/1988 | Blessing | 29/568 |

FOREIGN PATENT DOCUMENTS

| | | | |
|---|---|---|---|
| 23197 | 1/1981 | European Pat. Off. | 409/233 |
| 217460 | 1/1985 | Fed. Rep. of Germany | 409/233 |
| 2567056 | 1/1986 | France | 409/233 |
| 199308 | 9/1987 | Japan | 409/233 |
| 510319 | 6/1976 | U.S.S.R. | 409/233 |
| 197712 | 12/1977 | U.S.S.R. | 409/233 |
| 629015 | 9/1978 | U.S.S.R. | 409/233 |
| 776799 | 12/1980 | U.S.S.R. | 409/233 |
| 1117150 | 10/1984 | U.S.S.R. | 409/233 |
| 1168355 | 7/1985 | U.S.S.R. | 409/233 |
| 1340932 | 9/1987 | U.S.S.R. | 409/233 |
| 2076711 | 12/1981 | United Kingdom | 409/233 |

*Primary Examiner*—William Briggs
*Attorney, Agent, or Firm*—Christel, Bean & Linihan

[57] ABSTRACT

Quick change attachment for clamping chucks on a machine spindle in which a locking bush (32) is actuated by an axially shiftable locking piston for actuating the chuck clamping, while an adjusting rod (44) adjustable from the clamping cylinder is provided for actuating the clamping jaws of the chuck. Axially secured at the end of the adjusting rod to connect the clamping piston rod with the adjusting rod (44) are coupling pieces (50) which execute plier-like gripping and expanding movements by means of a tipping edge and are actuated from a control bush 58 overlapping them together with the locking bars for the chuck clamping driven by the locking bush (32).

12 Claims, 1 Drawing Sheet

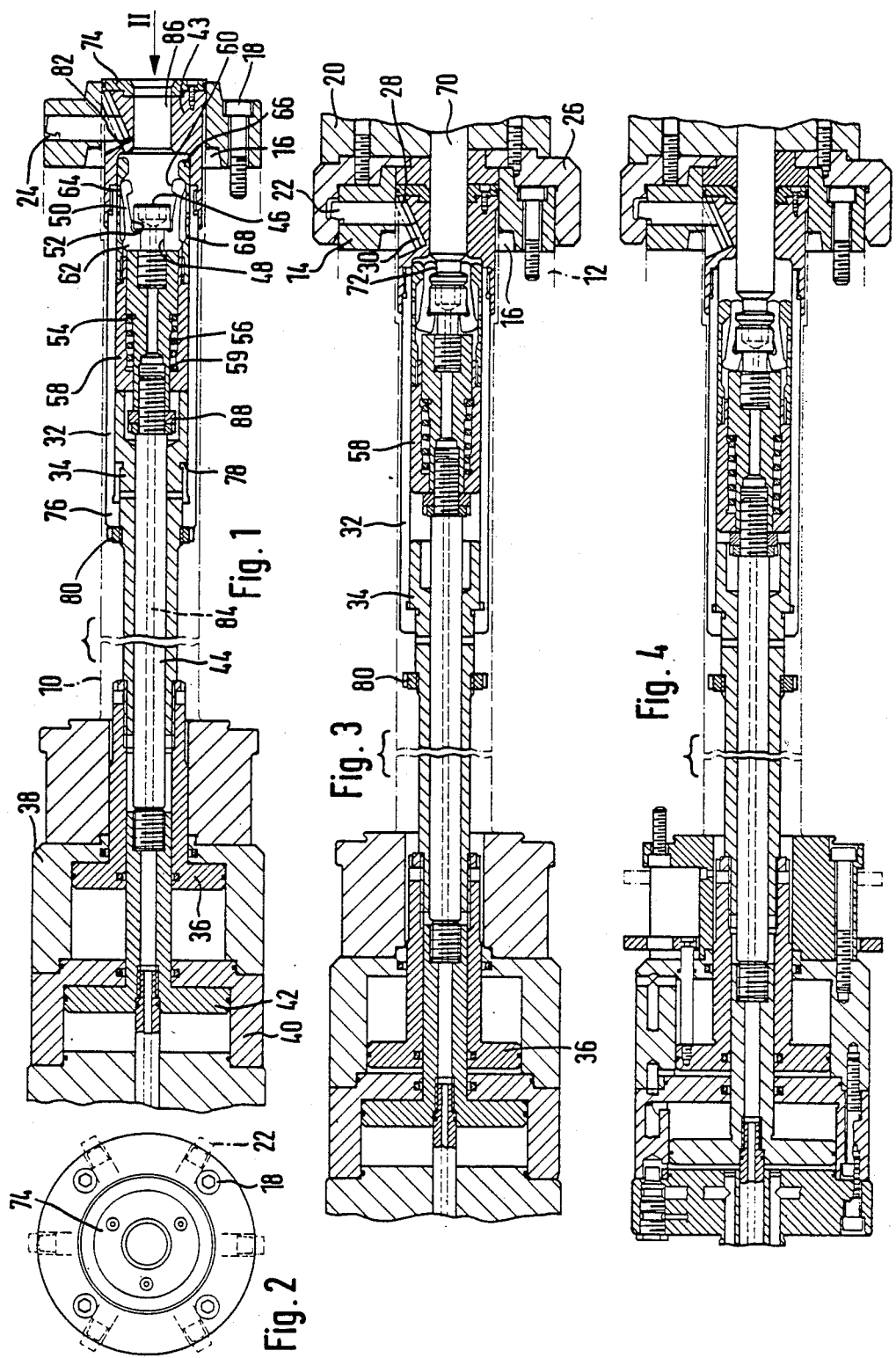

QUICK CHANGE ATTACHMENT FOR CLAMPING CHUCKS

The invention relates to a clamping chuck quick change attachment for a hollow-cylindrically rotating spindle, with a locking bush shiftable in the spindle for activating the chuck clamping, an adjusting rod extending through the locking bush which may be connected with the clamping piston rod via a coupling arrangement, and with a control bush shiftable between the locking bush and the adjusting rod which may be moved into a closed position by means of a spring and into an open position by external application against the resistance of the spring for the coupling arrangement.

A quick change attachment of the aforementioned type is described in the U.S. patent application Ser. No. 907,887 filed Sept. 15, 1986 originating with the applicant, in which the locking bush is pulled into the spindle away from the flange and the chuck clamping thereby eliminated for detaching the clamping chuck connected with the spindle. Simultaneous to this retracting motion, a mechanical coupling between the clamping piston rod and a hydraulically driven adjusting rod is also loosened for actuating the gripping power of the clamp. This coupling encompasses a clamping sleeve attached at the front end of the adjusting rod, around the circumference of which is located a belt of ports, with a rolling component whose diameter is greater than the wall thickness of the clamping sleeve being routed radially into each port. For actuating the coupling, the rolling components are pressed inward through the port belt with the help of a control bush routed outside on the clamping sleeve, where they engage a circumferential groove of a joining piece connected with the clamping piston rod and are in this way able to transfer the axial actuating forces exerted by the clamping cylinder and adjusting rod to the clamping chuck.

While the locking bush moves inward, a carrier attached to it takes along the control bush pretensioned with a spring in a coupling-actuating position until the point at which a circumferential groove located in the control bush becomes situated opposite the rolling components as a turn-off space and the coupling described above may now be lifted. When the clamping piston rod is pulled out of the clamping sleeve toward the front, the coupling engagement is ended by the rolling components being forced outward into the groove of the control bush.

This known design is disadvantageous, because high surface pressures are exerted during the load transmission by the relatively small rolling or prism components acting as coupling elements, so that the guides in the clamping sleeve close the receiving groove in the clamping piston rod as well as the allocated actuation surfaces on the control bush relatively fast during operation. This may be attributed in part to the fact that the coupling elements are contained in the clamping sleeve and only partially project radially inward out of their guides in order to engage the receiving groove of the clamping piston rod; this is because the coupling elements would fall out of the clamping sleeve after the removal of the clamping chuck given a wider opening. If not prone to failure, related remedial measures in the form of lateral projections attached to the coupling element, which limit the radial adjustment path of the coupling element in a groove or a slot, in any event prove to be complicated and costly.

The object of the present invention is to furnish the clamping chuck quick change attachment of the kind indicated at the outset with a robust and simple design which can withstand frequent clamping chuck changes and hence exhibits a longer life and can reduce the resetting times associated with a clamping chuck change to a minimum.

This object is achieved as per the invention by (1) the coupling arrangement exhibiting several coupling pieces secured axially in a circumferential groove at the end of the adjusting rod whose free ends carry projections pointing radially inward for engaging a circumferential groove of the clamping piston rod and which are supported on the circumference of the adjusting rod by an internal tipping edge for executing draw-in gripping and expanding movements, by (2) the control bush routed into the locking bush overlapping the coupling pieces outside and exhibiting internal annular cams, of which one each lies in the closed and opened positions of the control bush over one or the other end of the coupling pieces and keeps the latter in its closed or expanded state, and (3) by the locking bush being designed indirectly or directly as an arrangement for the forcible shifting of the control bush into the closed position.

In this structural design, the shell-shaped coupling pieces belonging to the coupling arrangement with their inwardly directed projections ensure flush engagement, so that the movements of the adjusting rod are forcibly transferred to the clamping jaw actuation of the chuck. Since the coupling is engaged and disengaged by an arrangement for forcibly shifting the control bush, the positively acting actuating means also provide defined signals which may be easily monitored for increasing operational reliability.

These features also make the quick change attachment suitable for use at installations with largely preplanned, program-controlled or so-called "flexible" manufacturing, which only covers requirements which are limited in time and avoids longer periods in storage with the corresponding financing costs. Instead of larger series production runs, this type of fabrication involves manufacturing small series or individual parts on the same machine, for which the quick change attachment ensures an automatically controlled chuck change with subsequent reliable actuation of gripping power. An important structural simplification involving a reduction in the internal measure of capacity of the spindle is brought about by the application of the shell-shaped coupling pieces, which engage flush into the circumferential groove of the clamping piston rod like grippers, so that the transfer of tensile force to the cross section of the shell-shaped coupling pieces and to the planar arrangement of their projections are distributed in the circumferential grooves of the adjusting rod and clamping piston rod.

This compares favorably with the prior art described above with respect to the high surface pressure exerted by the roller components, but also with the clamping sleeve connected to the adjusting rod, which guides the rolling component and must be shoved outside circumferentially over the joining piece of the clamping piston rod. Necessary for achieving an adequate transfer of clamping power is a sufficient number of coupling elements, which may only be situated on a large enough circumference or diameter of the clamping sleeve and circumferential grooves of the clamping piston rod.

In another essential feature of the quick change attachment as per the invention, the driving direction of the locking bush for shifting the control bush into its closed position coincides with the drive direction for actuating the locking bars for the chuck clamping. In prior art, only the release of the clamp lock coincides with the disengagement of the coupling for clamping power actuation, while the coupling is conversely engaged during the clamping of the clamping chuck by shifting the control box arrested beforehand over the rolling components using spring power. Therefore provided as per the invention for the control bush in both directions of movement is a geared drive, which precludes erroneous actuation. The still present pressure spring has the job of always keeping the control bush forcibly shifted for closing or engaging the coupling in the closed position via pretensioning, even when the adjusting rod is moved back and forth for actuating the clamping jaw of the chuck given a closed coupling.

In a preferred configuration of the invention, the drive direction of the locking bush may be directed toward the free spindle end for disengaging the locking bars while releasing the chuck clamping, with the front end of the locking bush carrying a pressure disk which forcibly presses away and separates the clamping chuck from the spindle flange given a released chuck clamping when the movement of the locking bush has stopped. This makes special separating arrangements for releasing the clamping chuck from the spindle flange unnecessary, since the clamping chuck is released automatically from the spindle flange when opening the chuck clamping of the clamping chuck. This feature is of particular importance during automatic chuck changes, even though the quick change attachment can make manual chuck changes considerably faster and easier.

In another feature of the invention, an actuating tube routed on the adjusting rod which shifts the locking bush in the same direction simultaneously with the shift of the control bush to open the coupling against the action of the pressure springs for releasing the chuck clamping may be provided for the geared drive of the control bush while disengaging the coupling.

For purposes of moving the locking bush in both directions, it may also extend to the actuating tube with an internal shoulder in the region between two external stops, with a gap being provided between the stops whose size is identical to or larger than the path of the control bush between the open position and closed position.

Another advantageous configuration of the coupling pieces always axially positioned with their back projection in the circumferential groove of the adjusting rod has to do with the fact that the coupling pieces are shell-shaped in design and provided with a front external sliding surface which forms an axial guide for the front annular cams of the control bush with the coupling closed. Much higher forces may be transferred with the help of such clamp-like coupling pieces than with the known rolling components or prisms.

In an additional feature of the invention, the central adjusting rod can contain a compressed air channel which is routed up to the coupling arrangement and/or further to the chuck in order to keep the coupling arrangement clean with pulses of compressed air on the one hand and on the other to execute a system check for the chuck or the workpiece at the spindle flange or the chuck, making automatic remote indications and monitoring possible from there.

Other features and advantages are presented in the following description of an embodiment of a quick change attachment according to the invention as well as in the drawing. The individual features, especially those in the claims, may embody additional forms of execution of the invention in themselves or in any other combination. Diagrammatically shown in FIG. 1 is a longitudinal view through a machine tool spindle of the quick change attachment as per the invention given an open coupling and withdrawn locking bar, FIG. 2 is a view of the spindle flange, FIG. 3 is a view of the quick change attachment similar to the one in FIG. 1 with gripped and coupled clamping chuck, and on FIG. 4 is a view of the attachment similar to the one in FIG. 3, but showing the adjusting rod running to the left including the coupling.

The words "front", "backward" or "back" which appear in the following and in the claims are used for providing a simplified description by having the spindle flange and the chuck to be locked there located in "front", while the clamping or locking actuating cylinders shown in the figures at the left end of the spindle are situated in the "back".

Attached to the end flange 12 of rotating a machine spindle 10 with screws 18 is an adaptation member 14 overlapping the annular shoulder 16 on the flange, with which the support base of the spindle for a clamping chuck 20 is broadened.

Uniformly distributed around the circumference inside the adaptation member 14 are radially directed locking bars 22 which can move in radial guide channels 24 between the withdrawn and extended positions. In their extended position as per FIGS. 3 and 4, the locking bars 22 lie against the adapted wedge surface of an adaptation member 26 bolted with the chuck 20, with which the chuck is directed toward the spindle flange or its adaptation member 14 and their kept locked in a clamped state.

Located at the base of every locking bar 22 is an inclined slide groove 28 open toward the bottom with which it slides on a guide rib 30 of a locking bush 32 provided with a suitable cross section (e.g., dovetail profile). The guide ribs 30 are worked out of the front thickened section of the locking bush 32 and ascend upward toward their front end and the circumference, indicating that the locking bars 22 reach and/or return to their extended position via the backward movement of the locking bush 32.

Locking bush 32, which may have a sectional design for easier assembly, extends toward the back in the centric bore hole of the spindle 10, and their with an internal shoulder 76 into the gap between the two stops 78 and 80 of an actuating tube 34. Actuating tube 34 is connected with a tubular locking piston 36 at the back end which may be shifted within a tubular locking cylinder 38 with the help of pressure. Shown on FIG. 1 is the locking cylinder in its front end position, into which the locking bars 22 are retracted with the help of locking bush 32, while in FIGS. 3 and 4 the locking bush is in the withdrawn position in which it grips the clamping chuck via the extended locking bars 22.

An adjusting rod 44 whose back end is connected with a clamping piston 42 shiftable in cylinder 40 extends through the tubular piston 36 and the actuating tube 34. Clamping piston 42 and adjusting rod 44 are used to actuate the clamping power of a clamping piston rod 70 moving the clamping jaws of the chuck which is contained in a central bore hole 86 at the front end of the locking bush 32 given a mounted clamping chuck 20.

Shell-shaped coupling pieces 50 of a coupling arrangement are axially positioned in a circumferential groove 48 on the front end of the adjusting rod 44, which has a sectional design and is bolted for reasons having to do with assembly. The circumferential groove 48 is advisedly furnished with a cap screw 46 whose shaft is screwed into a centric threaded bore hole of the adjusting rod 44. Extended through the adjusting rod 44 is a compressed air channel 84 also routed through the cap screw 46 with which slivers from processing and the like are blown out of the coupling, for example with the help of pulses of compressed air. System checks with automatic remote indications may be executed in the chuck for monitoring purposes with the help of a compressed air line routed even further.

The coupling pieces 50 situated around the entire circumference of adjusting rod 44 in one form of execution consist of three shell-shaped curved clamps which may be tilted between the open position as per FIG. 1 and the closed position as per FIGS. 3 and 4, as they are made to lean on the circumference of the head of screw 46 by an internal tipping edge 52. Each coupling piece has a front projection 60 pointing radially inward as well as a projection in the back 62 which fits in the circumferential groove 48. With the coupling open as in FIG. 1, the coupling pieces 50 are kept in an open, gripper-like state by a back annular cam 68 of the control bush 58 in which the projections 60 located at the front free ends open up a diameter corresponding at least to that of the cap screw 46.

If the clamping piston rod 70 is to be introduced through the centric bore hole 86 of the locking bush 32 and coupled with the adjusting rod 44, the control bush 58 along with the locking bush 32 is shifted in the end position lying furthest to the front in accordance with the operating condition of the quick change attachment shown in FIG. 1. Located in its right end position, the locking piston 36 has here also shifted the actuating tube 34, which with an expanded end section is adjacent to the control bush 58 and has lifted the latter from its stop 88 to the adjusting rod 44 against the force of the spring 56. Spring 56 is supported on a stop 54 of the adjusting rod 44 directed toward the back and presses with its other end against an opposite internal face 59 of the control bush 58.

In connection with the coupling arrangement, the control bush 58 constitutes an important component for the design and function of the quick change attachment as per the invention which may be designed in sections that can be bolted together as shown in the drawing to simplify manufacturing and assembly. Situated in the control bush 58 between the front and back annular cams 66 and 68 pointed radially inward is a longitudinal recess limited by the inclined stop faces of the annular cams whose length is noticeably smaller than the overall length of coupling pieces 50. It follows from this difference in length that coupling pieces 50, which never fit completely into the longitudinal recess of the control bush, are tilted as the case may be by one or the other annular cams 66 or 68 in one or the other direction in order to bring about the open position of the coupling as per FIG. 1 or the closed position of the coupling as per FIGS. 3 and 4. Even though not shown, it goes without saying that inclined or rounded sliding surfaces are allocated to the stop inclinations of annular cams 66 and 68 in order to ensure a low-friction, smooth closing and opening movement of the coupling pieces.

After a new clamping chuck has been placed on the spindle flange, the front projections 60 of the coupling pieces 50 get into a defined clamp or gripper-like engagement with a circumferential groove 72 of the clamping piston rod 70, while the back projection 62 of the coupling pieces continues to remain positioned in the circumferential groove 48 of the adjusting rod. This coupling procedure may be forcibly introduced with the help of the control bush 58 by pulling the locking bush 32 out of the open position as per FIG. 1 using the locking cylinder 36 and the actuating tube 34, with the locking bars 22 sliding to the outside and an internal shoulder 82 of the locking bush 32 shifting the control bush 58 over the coupling arrangement to the left. The inclined surface of the front annular cam 66 here runs against the front end of the coupling pieces 50 and sets off the tilting movement of the latter.

The movement of the control bush 58 which causes the coupling to close may also be initiated solely by the spring 56 as soon as the actuating tube has been shifted from the position as per FIG. 1 into the one shown in FIG. 3, with the stop 78 of the actuating tube 34 thereby only gripping the locking bush 32 when the back end of the control bush 58 already rests against the stop 88 of the adjusting rod 44. In this way, the clamp-like coupling 2 for clutching the clamping piston rod 70 is already closed before the chuck is clamped on the spindle flange with the help of the locking bars 22.

The sequence described above is repeated in reverse in order to release a clamping chuck from the spindle, i.e. the locking piston 36 is moved out of the position as per FIGS. 3 or 4 to the right along with the actuating rod 34, with the stop 80 shifting the locking bush 32 to the right so as to release the chuck clamping by moving the radial locking bars 22 back. By placing the face of the actuating tube 34 being moved to the right next to the control bush 58, the latter gets into the open position shown on FIG. 1, so that it shifts relative to the adjusting rod 44 and the coupling gripper opens, which frees the clamping piston rod 70. Even in the direction for opening the coupling, then, the actuation does not take place with an uncontrollable pretensioning, but rather with a defined signal acting on the hydraulic cylinder with which the operational reliability of the machinery may be monitored.

When actuating the locking bars 22 and the coupling pieces 50, a synchronization means for the releasing or opening functions should be on hand at least to ensure that the coupling—already opened—and the clamping lock are already eliminated when the pressure disk 74 attached to the locking bush 32 touches the clamping chuck 20 to be dismounted and gently pushes it away (compare position in FIG. 1), so that the clamping chuck may now be easily removed by hand or with a feeder arrangement.

I claim:

1. Clamping chuck quick change attachment for a hollow-cylindrical spindle (10), with a locking bush (32) for actuating the chuck clamping which may be shifted in the spindle, an adjusting rod (44) extending through the locking bush (32) which may be connected with the clamping piston rod (70) by means of a coupling arrangement, and with a control bush shiftable between the locking bush (32) and the adjusting rod (44) which may be moved into a closed position by means of a spring (56) supported on the adjusting rod and into an open position via external actuation against the force of the spring for the coupling arrangement, characterized by the fact that the coupling arrangement exhibits several axially fixed coupling pieces (50) in a circumferential groove (48) at the end of the adjusting rod (44) whose free ends carry projections (62) pointing radially inward for engaging the circumferential groove of the clamping piston rod (70) and which are supported by an internal tilting edge (52) on the circumference of the adjusting rod (44) for the execution of plier-like clamping and expanding movements, that the control bush (58) routed in the locking bush (52) overlaps the coupling pieces (5) from outside and exhibits internal annular cams (66, 68), of which one each lies over one or the other end of the coupling pieces in the closed and open positions of the control bush (58) and holds the latter in their closed or expanded state, and that the locking bush (32) is designed as an arrangement for the forcible shifting of the control bush (58) into the closed position.

2. Quick change attachment as per claim 1, characterized by the fact that the drive direction of the locking bush (32) designed for forcibly shifting the control bush (58) into its closed position coincides with the drive direction for actuating the locking bars (22) for the chuck clamping.

3. Quick change attachment as per claim 1, characterized by the fact that the drive direction of the locking bush (32) for retracting the locking bars (22) runs toward the free spindle end during the release of the chuck clamping and that the front end of the locking bush (32) carries a pressure disk (74) which forcibly presses away and separates the clamping chuck (20) from the spindle flange when the locking bush stops moving given a released chuck clamping.

4. Quick change attachment as per claim 1, characterized by the fact that the end of the pressure springs (56) facing the spindle flange (12) is secured to a stop (54) of the adjusting rod (44) and that its other end is adjacent to the shoulder (76) of the control bush (58) to pretension the latter for closing the coupling arrangement.

5. Quick change attachment as per claim 1, characterized by the fact that the slide guides (28, 30) at the front end of the locking bush (32) are inclined in such a way that the locking bars (22) are radially retracted when the locking bush (32) is shifted forward.

6. Quick change attachment as per claim 1, characterized by the fact that an actuating tube (34) routed on the adjusting rod which shifts the locking bush (32) in the same direction after the control bush has been shifted for opening the coupling arrangement following the initial compression of the spring (56) in order to release the chuck clamping is provided for the geared drive of the control bush (58).

7. Quick change attachment as per claim 6, characterized by the fact that the locking bush (32) engages the actuating tube (34) between two external stops (78, 80) with an internal collar (76) for axial shifting in both directions, with the gap between the stops (78, 80) being as large as or larger than the path of the control path (58) between the open position and the closed position.

8. Quick change attachment as per claim 1, characterized by the fact that the back projection (62) of the coupling pieces (50) is always axially positioned in the circumferential groove (48) at the end of the adjusting rod (44).

9. Quick change attachment as per claim 1, characterized by the fact that the coupling pieces (50) distributed on the circumference of the adjusting rod are shell-shaped and act as an axial guide with a front external sliding surface section (64) for the front annular cam (66) of the control bush (58) with the coupling closed.

10. Quick change attachment as per claim 1, characterized by the fact that a cap screw (46) whose head and the section of shaft adjacent to it together with the face of the adjusting rod form the circumferential groove (48) for the axial positioning of the coupling pieces is screwed into the front end of the adjusting rod (44).

11. Quick change attachment as per claim 1, characterized by the fact that the locking bush (32) in the region of its front end exhibits a radial internal shoulder (82) directed toward the back which lies opposite the front end of the control bush (58) for purposes of forcible shifting.

12. Quick change attachment as per claim 1, characterized by the fact that the centrally situated adjusting rod (44) contains an air channel (84) which is routed up to the coupling arrangement and further to the chuck, with the latter being employed to keep the coupling arrangement clean with the help of pulses of compressed air on the one hand and to carry out a system check for the chuck or workpiece, in particular with automatic remote indications and monitoring, at the chuck (20) or flange (12) on the other.

* * * * *